Feb. 1, 1966 V. STANZEL 3,232,001
JET PROPELLED MODEL VEHICLE
Filed Jan. 10, 1963 5 Sheets-Sheet 1
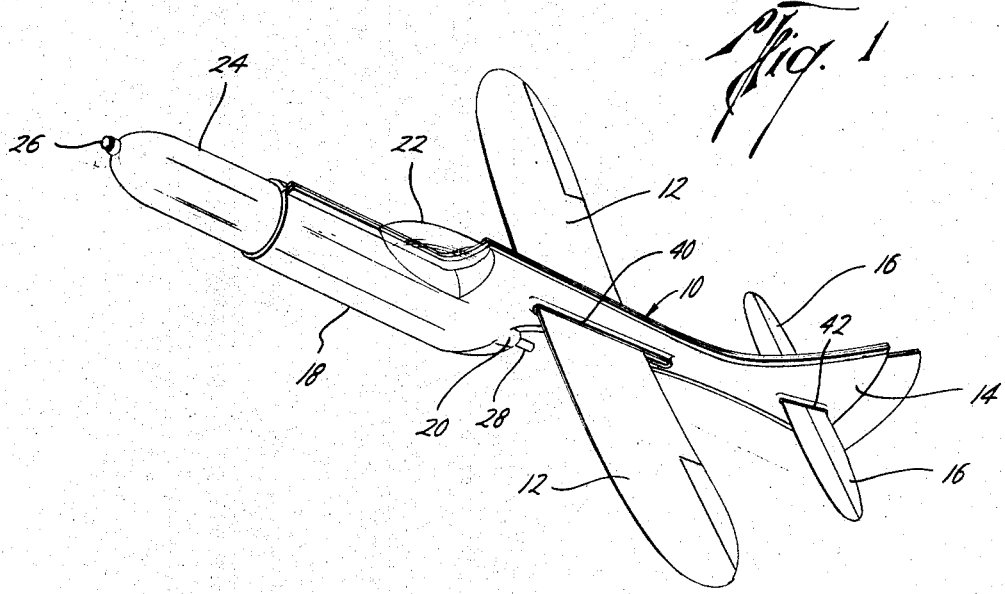
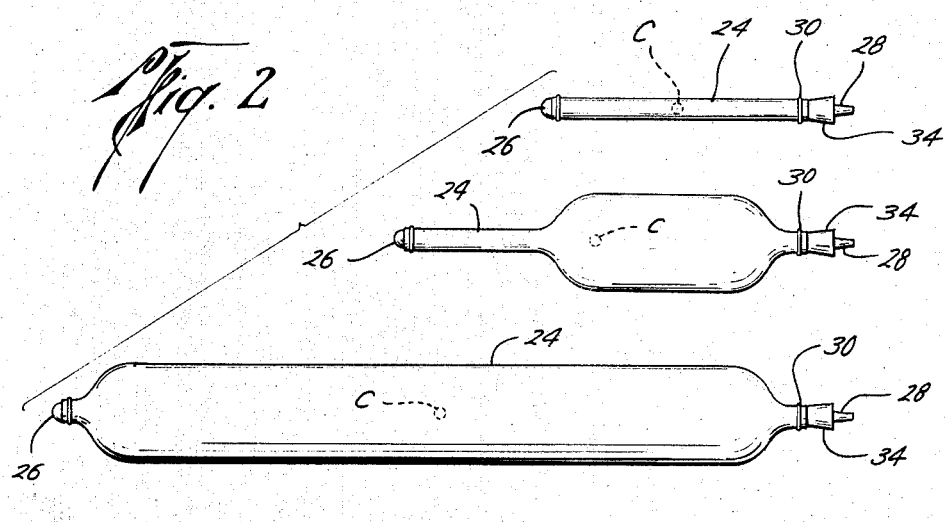
Victor Stanzel
INVENTOR.
BY Charles E. Lightfoot
ATTORNEY Feb. 1, 1966 V. STANZEL 3,232,001
JET PROPELLED MODEL VEHICLE
Filed Jan. 10, 1963 5 Sheets-Sheet 2
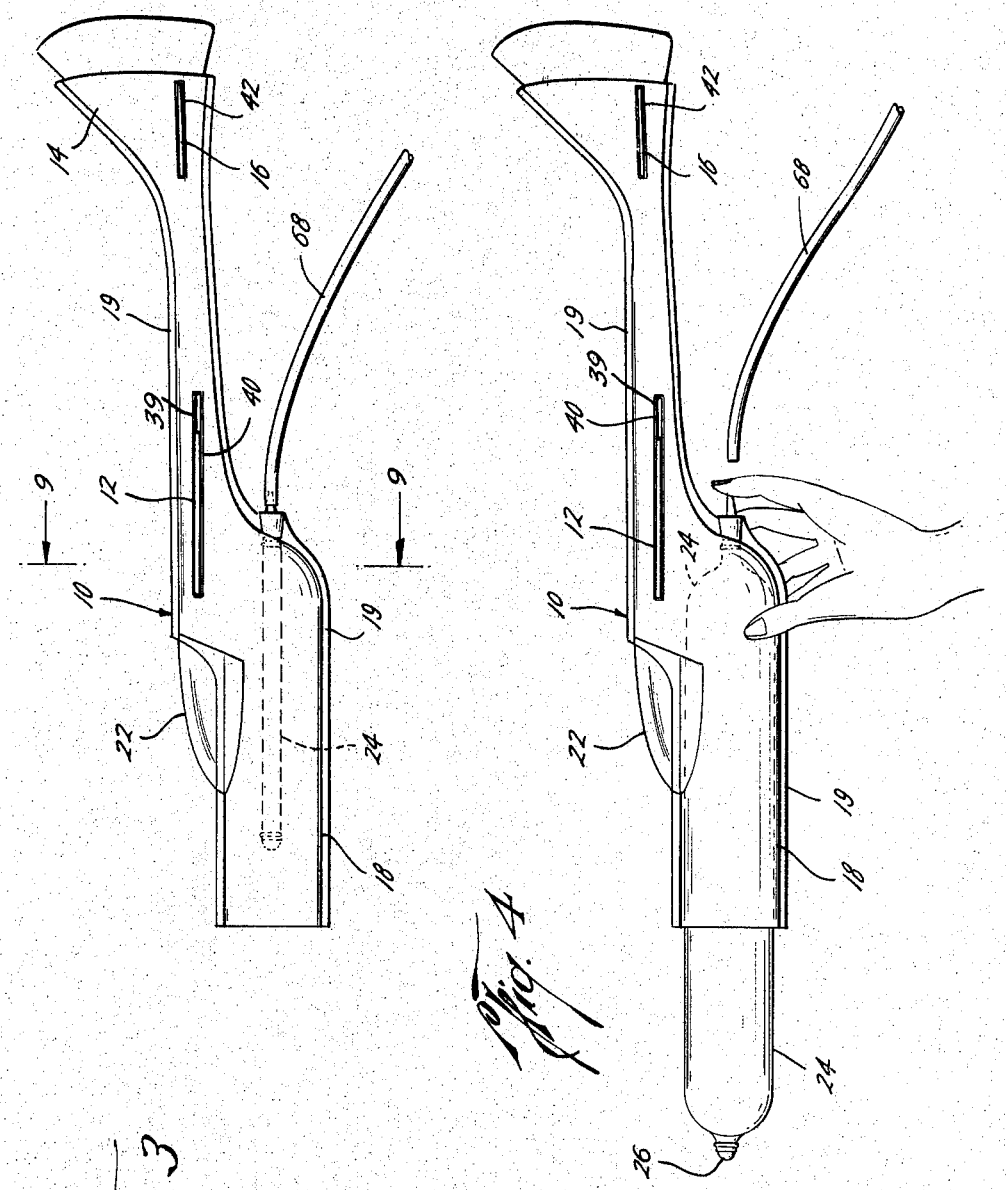
Victor Stanzel
INVENTOR.
BY
Charles E. Lightfoot
ATTORNEY

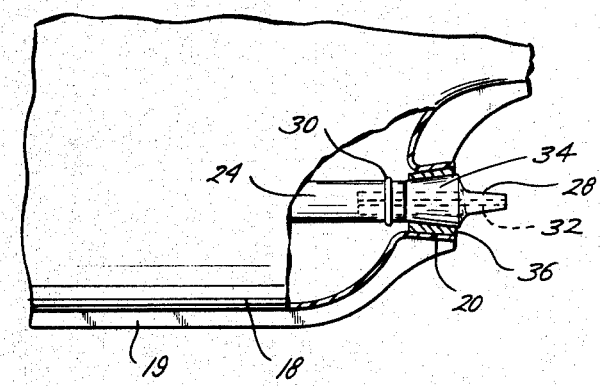
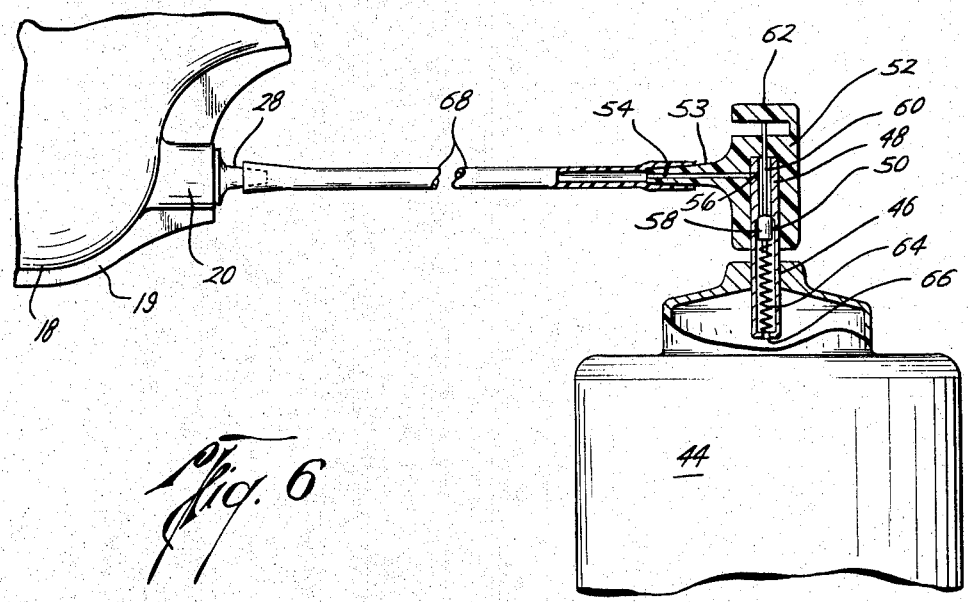

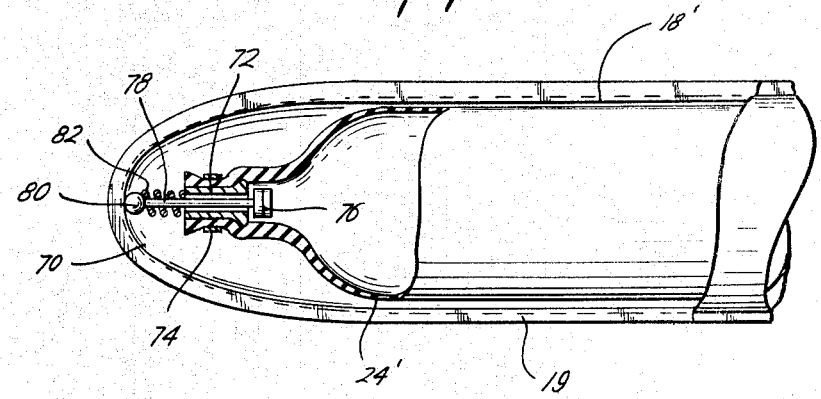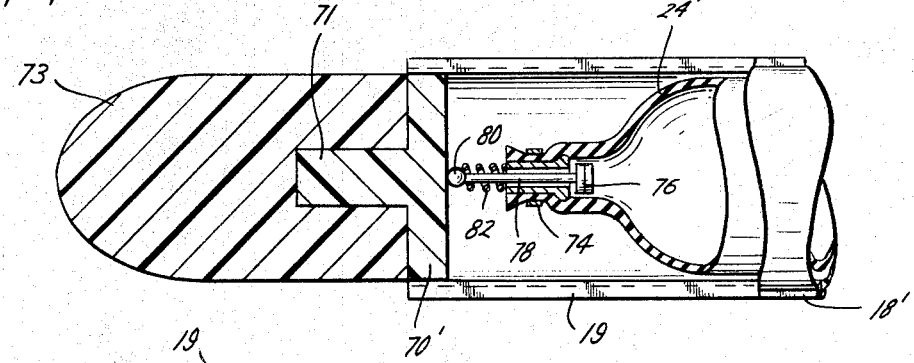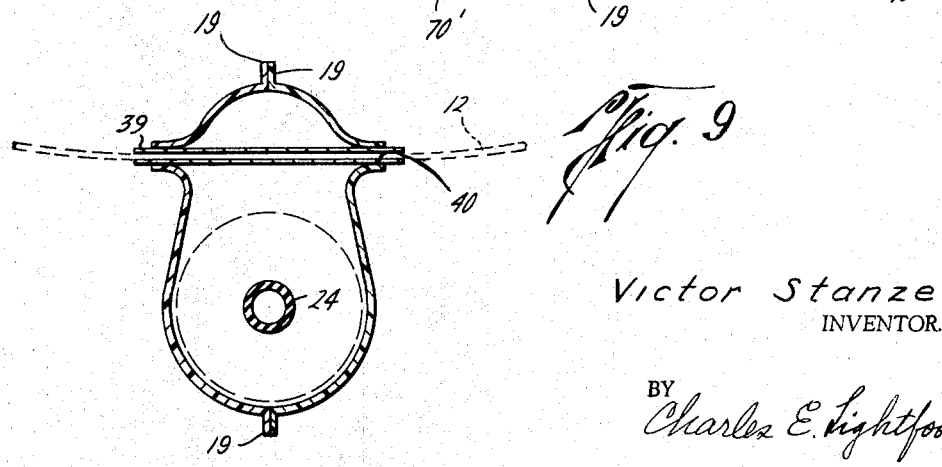

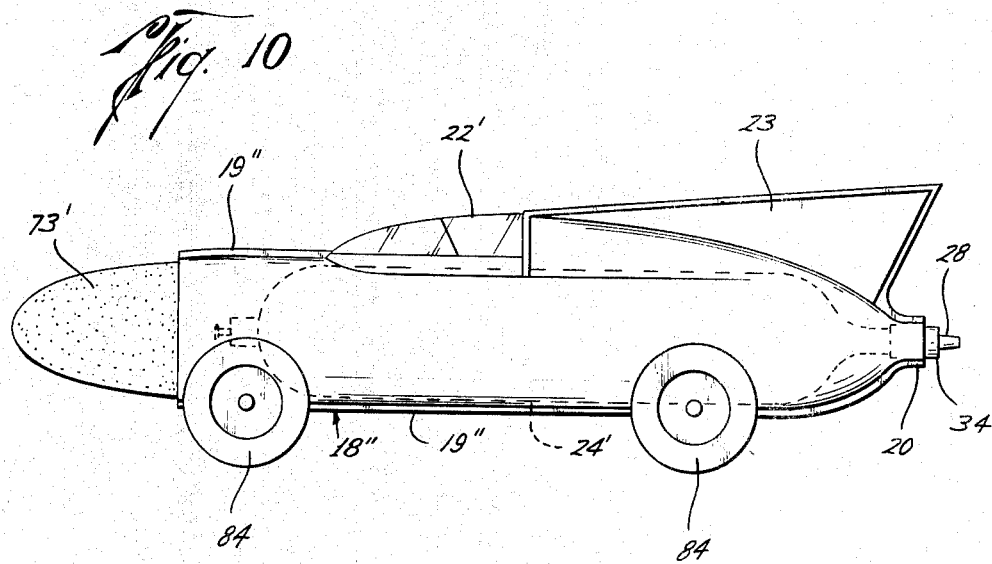
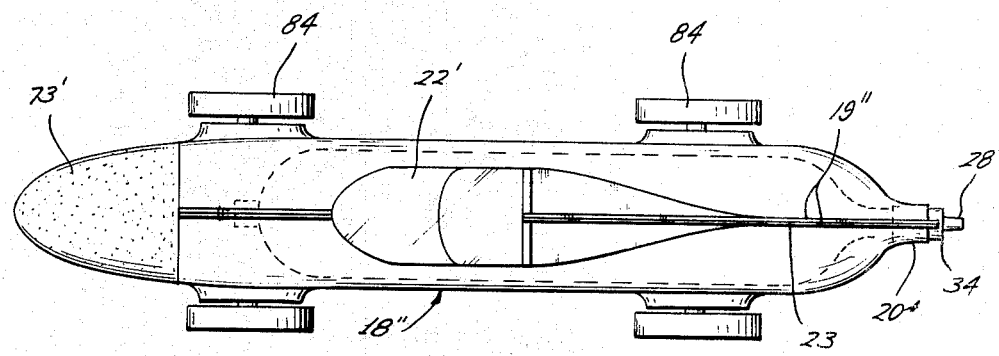
Victor Stanzel
INVENTOR.
BY Charles E. Lightfoot
ATTORNEY

3,232,001
JET PROPELLED MODEL VEHICLE
Victor Stanzel, P.O. Box 28, Schulenburg, Tex.
Filed Jan. 10, 1963, Ser. No. 250,642
9 Claims. (Cl. 46—76)

This application is a continuation-in-part of previous applications of the same applicant, Serial No. 787,594, filed January 19, 1959, now Patent No. 3,045,391, issued July 24, 1962, and Serial No. 207,493, filed July 5, 1962, now abandoned.

This invention relates to model vehicles, such as automobiles, aircraft, spacecraft, or the like, and more particularly to jet propulsion apparatus for such vehicles.

The invention is capable of wide application in connection with toys and models of various types of vehicles and finds particular utility in the propulsion of model airplanes, space vehicles, or the like, in which the power source for operation of the craft is carried by the vehicle itself.

Various methods have been proposed heretofore for the free flight propulsion of model aircraft, by rubber band motors or by the use of jets. Free flight propulsion methods of this kind, in which the power source is carried on the vehicle, however, possess the disadvantage that the entire weight of the power source and propulsion mechanism must be airborne, which greatly increases the cost and limits the operational characteristics of the craft.

It has also been proposed to propel model aircraft from power sources which are not airborne but which may be remotely located relative to the aircraft, as by the use of flexible cables by which rotational force may be transmitted to the propellers, or through the employment of flexible, tubular supply lines through which pressure fluid may be supplied to jets. Such remotely powered propulsion mechanism does not, however, leave the aircraft completely free in flight, but involves a certain amount of tethering which greatly limits the range and movements of the craft.

In experimenting with pressure fluid jet propelled model aircraft, it has been found that the use of pressure fluid containers of rigid construction is not satisfactory because of the relatively sudden drop in pressure which takes place as the fluid is discharged from the container. The resultant wide range or drop in the thrust developed by the jet when such a container is used makes it difficult to adjust the aircraft, at take-off, for satisfactory aerodynamic flight performance.

It has been found that the use of elastic, expansible pressure fluid containers is more desirable for the purpose of maintaining more constant pressure throughout the entire period of discharge of the pressure fluid through the jet from maximum to minimum inflation of the container. The use of conventional toy balloons as containers for the supply of pressure fluid for jet operation was also found to be unsatisfactory because of the relatively large size to which such balloons are distended when inflated at low pressure, resulting in large areas presented to wind resistance and insufficient pressure to obtain the desired jet thrust.

Further research has established the fact that the use of an elastic fluid container having a high ratio of wall thickness to internal diameter, namely, a heavy wall thickness and small inside diameter, was most desirable for this purpose, because such a container has a small frontal area exposed to wind resistance when inflated and is capable of maintaining a relatively high discharge pressure until substantially completely deflated.

Experiments have further developed that an elastic container of the above type, provides the constant fluid pressure which is desirable for most satisfactory flight of pressure fluid operated, jet propelled, free flying model aircraft which must be pre-set for aerodynamic and static balance at the take-off.

The most important discovery which has been made, in the research carried out on this type of model aircraft is the fact that if one end of an elastic pressure fluid container, of the kind described, is attached to the structure of a free flying model aircraft in such a manner as to allow the container to distend forwardly upon being inflated, the resultant forward displacement of the center of gravity of the aircraft as a whole may be made sufficient to counteract the inherent tendency of the craft to climb sharply and loop over backward when in propelled flight. By this means the aircraft may be made to fly in a level or straight forward path during power propulsion and to follow a satisfactory flat glide path after the power has been expended.

The present invention has for an important object the provision of a model aircraft which is solely aerodynamically supported in flight and in which the power source for propulsion is carried by the craft.

Another object of the invention is to provide a model vehicle which is propelled by the ractive force exerted by a jet of pressure fluid.

A further object of the invention is the provision in a model aircraft of the jet propelled type of a supply container for pressure fluid which is formed of flexible, elastic material, designed to be inflated by fluid under pressure and to deliver the fluid to the jet at a substantially constant pressure during deflation of the container.

Another object of the invention is to provide an inflatable, flexible, elastic, pressure fluid supply container for operation of model vehicles of the kind mentioned which container when inflated is shaped to present a minimum resistance to the forward movement of the vehicle in flight.

A further object of the invention is to provide a flexible, elastic, inflatable, pressure fluid propellant container for model vehicles of the jet type in which the wall thickness of the container, relative to the diameter thereof, is such as to prevent substantial reduction in the pressure of the fluid delivered by the container during deflation of the same.

Another object of the invention is the provision of an elastic, flexible, inflatable, pressure fluid container of the type referred to, which is constructed to be inflated by pressure fluid at a substantially constant pressure from a deflated to an inflated condition, and to deliver such pressure fluid to a jet at substantially the same pressure from said inflated to said deflated condition of the container.

A further object of the invention is to provide an elastic fluid container for use as a source of pressure fluid for the operation of model aircraft or other vehicles of the jet propelled type having means for preventing the over inflation of the container.

A further object of the invention is the provision in a free-flight model aircraft which is adjusted to glide downwardly at a relatively small angle to the horizontal in unpropelled flight, and which has a tendency to climb or loop upwardly excessively in flight under power propulsion, and having propulsion means by which the craft is propelled during an initial period of its flight and thereafter allowed to glide or coast through the remainder of its flight, of means for shifting the center of gravity of the craft longitudinally to a forwardly advanced position prior to the commencement of flight to counteract such tendency and for allowing the center of gravity to shift rearwardly from said advanced position during such initial period of flight to restore the flat gliding adjustment during the remainder of the flight.

A further object of the invention is to provide a model aircraft of the jet propelled type which has an inherent tendency to climb or loop upwardly in flight under power propulsion, having an elongated elastic, flexible, inflatable pressure fluid supply container mounted thereon and which is positioned to be extended longitudinally of the aircraft when inflated to cause a longitudinal displacement of the center of gravity of the aircraft forwardly thereof to counteract such tendency to climb or look upwardly excessively in flight under power, and to decrease in length upon deflation to reduce such longitudinal displacement whereby the aircraft may be caused to follow a substantially predetermined path of flight upon cessation of power propulsion.

Another object of the invention is the provision in a model aircraft which is jet propelled, and having an elastic, expansible, pressure fluid supply container therefor carried by the craft, of a source of pressure fluid for the container and releasable means for connecting the source to the container to inflate the same.

A further object of the invention is to provide an elastic expansible, pressure fluid supply container and jet assembly for model vehicles of the kind referred to, and means for releasably attaching the assembly to the vehicle to facilitate replacement of the assembly.

Another object of the invention is to provide a model vehicle having a hollow, relatively thin-walled body formed of molded plastic embodying novel reenforcing and rigidifying means.

A further object of the invention is the provision in a model vehicular structure of a hollow, thin-walled molded plastic body which is internally braced and externally reenforced.

Another object of the invention is to provide a model aircraft having a wing structure which is easily adjusted to vary the free-flight performance of the craft and in which the wings are readily replaceable.

The above and other important objects and advantages of the invention may best be understood from the following detailed description when considered in conjunction with the annexed drawings, wherein—

FIGURE 1 is a perspective view, illustrating the invention as applied to a model aircraft and showing the same in a substantially fully inflated condition at the commencement of its flight;

FIGURE 2 is a composite view of the pressure fluid storage and propulsion means of the invention, separated from the vehicle to be propelled and in several different stages of its inflation or deflation;

FIGURE 3 is a side elevational view of the aircraft of FIGURE 1 with the pressure storage reservoir in a deflated condition and connected in communication with a source of fluid under pressure, preparatory to the inflation of the same;

FIGURE 4 is a view similar to that of FIGURE 3, showing the aircraft with the storage reservoir fully inflated and ready for flight;

FIGURE 5 is a fragmentary view, partly broken away and partly in cross-section and on a somewhate enlarged scale, of a portion of the fuselage of the aircraft of FIGURE 1, showing details of structure and manner of mounting of the pressure fluid supply reservoir and propulsion mechanism;

FIGURE 6 is a fragmentary side elevational view, partly broken away and partly in cross-section showing a portion of the fuselage of the aircraft of FIGURE 1 and its propulsion mechanism together with a replenishment container of fluid under pressure and the manner in which the same is employed in replenishing the supply of such fluid for the propulsion of the aircraft;

FIGURE 7 is a fragmentary, longitudinal, central, cross-sectional view, on a somewhat enlarged scale, of a modified form of the invention.

FIGURE 8 is a view similar to that of FIGURE 7 illustrating a further modification of the invention;

FIGURE 9 is a cross-sectional view, on a somewhat enlarged scale, taken along the line 9—9 of FIGURE 3 looking in the direction indicated by the arrows;

FIGURE 10 is a side elevational view illustrating the invention as applied to a wheeled vehicle; and FIGURE 11 is a top plan view of the invention as illustrated in FIGURE 10.

Referring now to the drawings in greater detail the invention is illustrated herein particularly in connection with its application to the propulsion of model aircraft of the type which is solely aerodynamically supported in flight, such as the airplane shown in FIGURES 1, 3 and 4, having a fuselage, generally designated 10, provided with wings 12, 12 and having the tail structure 14 including stabilizers 16 of usual construction. The fuselage is provided at its forward portion with a forwardly extending tubular portion or housing 18, which, in the form of the invention illustrated in FIGURES 1, 3 and 4 is open at its forward end and formed at its rear end with an external, longitudinally rearwardly extending, open, outwardly flaring neck 20.

The fuselage of the aircraft may be formed of light weight material such as balsa wood or plastic, and is preferably constructed of thin sheet plastic vacuum formed in two halves shaped to be cemented together along a central longitudinal plane to form a hollow body. Each of the halves of the body is formed with an external, outwardly extending peripheral flange 19, so that when the parts are assembled and cemented together an external, longitudinal reenforcing and rigidifying flange extends centrally about the body. The wings 12 are preferably made in one piece of suitable material, such as balsa wood or balsa wood and fibre laminate held in position frictionally by extending the wing piece through a flattened tubular insert 39, best shown in FIGURE 9, extending across the interior of the fuselage and into the transversely aligned side slots 40 in the fuselage. The flattened insert 39 is of greater fore and aft width and the slots 40 are of greater length than the fore and aft width of the wing piece to allow the wing piece to be adjusted longitudinally of the craft whereby the wings may be adjusted to control the path of flight of the craft.

The stabilizers 16 are similarly made in one piece and secured to the fuselage in the same manner as the wings, by extending the same through transversely aligned slots 42 and cementing the same to the wall of the fuselage.

The fuselage may also be provided with a clear plastic greenhouse or cockpit cover 22.

The propulsion mechanism of the aircraft comprises an elongated, tubular, elastic walled, expansible, pressure fluid container 24, located in the tubular portion 18, and which is formed of suitable elastic material such as latex, rubber, or the like. The container, in its unexpanded or deflated condition is preferably of relatively small diameter, as compared with the diameter of the housing 18 and is also of strong thick-wall construction designed to hold pressure fluid, such as air or other gaseous fluid under substantial pressure when inflated. The ratio of the wall thickness of the container to its inside diameter is preferably in the range of from 1:4 to 1:2 to provide a container having ample strength and to provide relatively high pressures while presenting only a minimum end area when inflated.

Thus, the elastic walled container will be expanded by the introduction of fluid at a predetermined pressure and will continue to expand under the application of pressure, but the pressure in the container will not be increased beyond that required for expansion.

By way of example, a latex tube having a wall thickness of $3/32''$ and an inside diameter of $3/16''$, providing a ratio of wall thickness to inside diameter of 1:2, will expand to a maximum outside diameter of approximately $15/16''$ when inflated with air and will provide a pressure of about 30 pounds per square inch.

Similarly, a latex tube having an internal diameter of 3/16" and a wall thickness of 1/16", to provide a ratio of wall thickness to internal diameter of 1:3, will expand to an outside diameter of about 1½" with a constant working pressure of approximately 18 pounds per square inch, until deflated. By the use of expansible, elastic walled containers having a ratio of wall thickness to inside diameter within the approximate range mentioned, the container will be extended longitudinally when inflated, but will maintain the same approximately maximum outside diameter throughout its length under a constant pressure of the operating fluid.

The elastic container may be formed with a closed forward end or may be closed at its forward end by a plug 26 or other suitable means. The container has at its rear end a tubular member 28 inserted therein and which extends rearwardly therefrom and may be secured in place by any suitable means, such as the clamp ring 30. The member 28 has a relatively small bore 32 extending therethrough, as seen in dotted lines in FIGURE 5, which bore forms a jet orifice through which the pressure fluid is discharged from the container in a direction rearwardly of the aircraft to propel the craft forward.

An externally tapered plug 34 is fitted on the rearwardly extending external portion of the member 28, which plug is adapted to be tightly but removably inserted into a matching, internally tapered, plastic, seat element or socket 36 fixed in the neck 20. The container, orifice member 28 and plug 34 thus constitute a pressure fluid propulsion assembly which is readily removed and replaced when desired.

The elastic container is preferably of a length somewhat less than that of the housing 18 when the container is deflated, and when fully inflated the container will extend forwardly beyond the open forward end of the housing as seen in FIGURE 1. By suitably selecting a container of the proper ratio of wall thickness to internal diameter to provide the pressure at which the container is to be operated, the container will be expanded to an outside diameter to substantially close the housing without danger of damaging the same by over expansion.

When the container has been properly inflated in the housing the jet orifice 32 may be closed by the operator by placing a finger over the jet outlet. The aircraft may then be held in a position for take off and released by opening the jet, whereupon fluid under pressure will be discharged rearwardly through the orifice to provide a forward thrust to propel the craft into flight.

The model aircraft is adjusted, aerodynamically to fly in a level path, commonly referred to as a flat glide when not being propelled by the power of the jet. Model aircraft of this type, however, when so adjusted, have a tendency to climb sharply or loop upwardly under the propulsive force of the jet. This tendency is counteracted in the present invention by fixing the rear end of the elastic container 24 to the housing by the plug 34, so that when the container is inflated the center of gravity of the craft is shifted longitudinally forwardly sufficiently to offset the excessive climbing or looping tendency of the craft during the propulsion of the craft forward by the jet. As the fluid is discharged during propulsion of the craft the length of the container will gradually diminish, so that the center of gravity is progressively shifted rearwardly, whereby the craft is maintained in a more or less level condition during propulsion and when the container has been deflated the center of gravity will then be such that the craft will continue its flight in a substantially flat glide.

The manner in which the center of gravity is shifted forwardly, is illustrated in FIGURE 2, wherein the container is shown in deflated, partly inflated and in fully inflated condition, the center of gravity being indicated at C.

Any suitable pressure fluid may be employed for the propulsion of the aircraft, such as air or other gas. Liquid dichlorodifluoromethane is, however, preferable to ordinary gaseous pressure mediums for inflating the elastic container, because of the constant pressure obtainable with such material, the convenience with which it may be stored in a liquid state, the small volume occupied by the liquid material and the great increase in volume obtained upon vaporization. The dichlorodifluoromethane, or other similar readily liquified propellant, may be supplied in liquid form under pressure in a suitable container, such as a metal can, shown at 44 in FIGURE 6, having valve mechanism fitted into its top, whereby the supply of pressure fluid from the container may be controlled. The valve mechanism in the present illustration comprises a tubular stem 46 inserted through and suitably secured to the top of the can 44 and whose lower end is open. The stem 46 is internally thickened as indicated at 48 to form an internal valve seat 50 therein located mediate the ends of the stem.

The upper end portion of the stem 46 is enclosed in a cap 52 having a side arm 53 provided with an outlet passageway 54 whose inner end is in communication with an outlet opening 56 from the interior of the stem above the seat 50. A valve 58 is movably disposed in the stem below the seat 50 in position to open and close the same and is provided with an actuating stem 60 which is slidably extended through the upper end of the cap 52. The cap 52 also has a flexible portion 62 located above its upper end positioned to engage the upper end of the valve stem 60 and which may be depressed to open the valve. The valve is yieldably held in closing position on the seat 50 by means of a coil spring 64 whose upper end is seated on the lower face of the valve and whose lower end engages an inwardly extending flange 66 on the lower end of the stem 46.

A flexible tube 68 is provided whose inlet end is attached to the side arm 53 in communication with the passageway 54 thereof, and whose outlet end may be fitted over the outer end of the tubular member 28 of the elastic container 24 in communication with the interior thereof through the bore 32 to inflate the container when the valve 50 is opened.

With the flexible tube thus connected in place the elastic fluid container 24 may be readily inflated by depressing the flexible portion or pad 62 to open valve 50. When the elastic container has thus been sufficiently inflated the valve 50 allowed to close, after which the tube 68 may be pulled off of the member 28 and the jet orifice quickly closed by pressing the finger over the outer end of the orifice, as shown in FIGURE 4, until the plane is to be launched into flight.

In some applications of the invention it may be desirable to completely enclose the elastic pressure fluid container within the structure of the aircraft by closing the forward end of the housing 18' as seen at 70 in FIGURE 7. In this type of construction the container cannot be seen to determine when it has been completely filled and because of the relatively high pressure of the fluid from the supply source 44 there would then be danger of over-inflation and over-extension of the container with consequent damage to the structure.

To prevent such over-inflation the invention may be modified as illustrated in FIGURE 7, wherein the container is provided with a tubular plug 72 into the end of the container and secured therein by means of a clamp ring 74, the inner end of the plug forming a seat for a valve 76 movably disposed in the container and having a stem 78 slidably extended through the plug and whose outer end is formed with a knob 80. The valve 76 is yieldably held closed by a coil spring 82 surrounding the stem 78 with the outer end of the spring in engagement with the knob 80 and the inner end of the spring seating on the outer end of the plug 72.

By this construction over-inflation of the container is prevented by engagement of the knob 80 with the inside of the closed end 70 of the housing to open the valve 76 when the container has been inflated to allow excess pressure to escape through the plug 72. As soon as the pressure in the container has decreased sufficiently to allow the spring 82 to close the valve 76 further outflow of pressure fluid from the container through the plug 72 will cease. In other respects the form of the invention illustrated in FIGURE 7 is like that illustrated in FIGURES 1 to 6.

A further modification of the invention is illustrated in FIGURE 8 wherein the forward end of the tubular portion 18' of the body is closed by a closure member or plug 70' which may be conveniently formed of wood or other suitable material and which has an external, forwardly extending, central peg or lug 71. A nose cone 73 formed of resilient material such as sponge, plastic or rubber is fitted onto the peg 71 in contact with the outer face of the plug 70' in position to receive the impact when the forward end of the vehicle strikes some object in its path of flight to cushion the shock of such impact and prevent damage to the vehicle. In other respects the form of the invention illustrated in FIGURE 8 is substantially the same as that of FIGURE 7 and similarly operated.

The invention may also be applied to vehicles other than aircraft, such for example, as the wheeled vehicle illustrated in FIGURES 10 and 11, wherein a vehicle of the automobile type is shown having a hollow body 18" shaped generally like the tubular body portion 18 and similarly constructed with the external flanges 19" which form an external reinforcing flange about the body when the parts are cemented together. In this form of the invention the body is mounted on the usual wheels 84. The body may be provided with a cockpit cover 22', or the like, similar to the cover 22 and with a central, longitudinal, upstanding tail vane 23. At its forward end the body is provided with a nose cone 73' similar to the nose cone 73 of the vehicle illustrated in FIGURE 8 and for the same purpose. At its rear end the body has a rearwardly projecting tubular neck 20' similar to the neck 20 show in FIGURES 5 and 6. The vehicle of FIGURES 10 and 11 is provided with the same flexible walled pressure fluid container 24' as previously described in connection with the form of the invention illustrated in FIGURE 7, which is furnished with the same rearwardly extending jet mechanism illustrated in FIGURE 5, mounted in the same way to provide propulsion for the vehicle and which also has the same inflation limiting mechanism at the forward end of the container.

In the operation of this form of the invention the container 24' is inflated as previously described and upon discharging of the pressure fluid through the jet the vehicle will be propelled forwardly on the wheels 84.

The pressure fluid in the source 44 may, of course, be under any desired pressure substantially higher than the pressure to which the elastic container 24 is to be inflated.

Although the invention is disclosed herein in connection with certain specific embodiments of the same, it will be understood that these are intended by way of example only, and that the invention may be applied with equal facility to jet propulsion of flying model aircraft, spacecraft, or other types of propelled vehicles.

Having thus clearly shown and described the invention, what is claimed as new and desired to secure by Letters Patent is:

1. In propulsion mechanism for a jet propelled model vehicle having a hollow body and rearwardly directed jet means positioned to propel the vehicle forwardly upon the discharge of pressure fluid through the jet, an inflatable, pressure fluid container means of thick, elastic-walled construction carried by the vehicle, said container means being cylindrical throughout the main portion of its body both in fully deflated and fully inflated conditions, and being substantially longer and of greater diameter when fully inflated than when fully deflated, and having a discharge outlet in communication with said jet to discharge fluid under substantially constant pressure through the jet during deflation of the container from a fully inflated condition to a substantially deflated condition.

2. In propulsion mechanism for a jet propelled model vehicle having a hollow body and rearwardly directed jet means positioned to propel the vehicle forwardly upon the discharge of pressure fluid through the jet, an inflatable, generally cylindrical elastic-walled pressure fluid container means whose wall thickness is from about one-fourth to about one-half of the internal diameter of the container means in deflated condition carried by the vehicle and having a discharge outlet in communication with said jet to discharge fluid under a substantially constant pressure through the jet during deflation of the container from a fully inflated condition to a substantially fully deflated condition.

3. In propulsion mechanism for a jet propelled model aircraft which is solely aerodynamically supported in flight and having an elongated body and rearwardly directed jet means positioned to propel the craft forwardly upon the discharge of pressure fluid through the jet, an inflatable, generally cylindrical, elastic-walled, pressure fluid container means whose internal diameter is from about two to about four times the thickness of the container wall in the deflated condition of the container carried by the aircraft and having a discharge outlet in communication with said jet to discharge fluid under a substantially constant pressure through the jet during deflation of the container from a fully inflated condition to a substantially fully deflated condition.

4. In a jet propelled model vehicle a body formed with a longitudinally axially extending housing whose forward end is closed and whose rear end is open, an expansible, elastic-walled, pressure fluid container in the housing and having a discharge opening positioned to discharge fluid under pressure rearwardly from said rear end to exert a forward thrust on the vehicle and a pressure relief port positioned to allow the outflow of fluid from the container forwardly in the housing, valve means movably carried by the container for movement into and out of a position to close said port and including means positioned for coaction with the valve and the closed end of the housing to open said port when the container reaches a predetermined position of expansion in the housing.

5. In a jet propelled model vehicle a body formed with a longitudinally axially extending housing whose forward end is closed and whose rear end is open, an expansible, elastic-walled, pressure fluid container in the housing and having a discharge opening position to discharge fluid under pressure rearwardly from said rear and to exert a forward thrust on the vehicle and a pressure relief port positioned to allow the outflow of fluid from the container forwardly in the housing, a valve movably disposed in the container in position to close said port under the influence of the pressure of fluid in the container, and means positioned for coaction with the valve and the closed end of the housing to open the valve when the container reaches a predetermined position in its expansive movement in the housing.

6. In model aircraft a hollow fuselage formed in two complementary parts secured together in a common plane extending longitudinally, centrally of the craft, each of said parts having an external outwardly extending marginal flange positioned in facing contact with the flange of the other part in said plane, and a longitudinally elongated side slot positioned in lateral alignment with the slot of the other part, a flattened tubular member extending across the interior of the body and secured thereto in said slots, and a generally flat wing element extending through said member and beyond the opposite sides of the body.

7. In model aircraft a hollow fuselage formed in two complementary parts secured together in a common plane extending longitudinally, centrally of the craft, each of said parts having an external outwardly extending marginal flange positioned in facing contact with the flange of the other part in said plane, and a longitudinally elongated side slot positioned in lateral alignment with the slot of the other part, a flattened tubular member extending across the interior of the body and from end to end of and secured to the body in said slots, and a generally flat wing element slidably extended through said slots and extending beyond the opposite sides of the body and whose width is less than the length of said slots.

8. In propulsion mechanism for a jet propelled model vehicle having an elongated tubular body and jet means closing the rear end of the body in position to discharge pressure fluid rearwardly therefrom to propel the vehicle forwardly, a tubular, elastic, flexible-walled pressure fluid container in the body having a rear end discharge outlet in communication with the jet to discharge fluid under pressure rearwardly therethrough, means for allowing the escape of fluid from the forward end of the container into the body when the container has reached a predetermined condition of inflation, and a nose cone releasably closing the forward end of the body.

9. Jet propulsion mechanism comprising an expansible, flexible-walled pressure fluid container having a discharge outlet, jet forming means connected to the container in communication with said outlet and through which fluid under pressure may flow out of the container, means for securing the container to an object to be propelled, and means independent of said jet forming means for allowing an outflow of fluid from the container when the container reaches a predetermined condition of inflation.

References Cited by the Examiner

UNITED STATES PATENTS

| | | | |
|---|---|---|---|
| 1,792,779 | 2/1931 | Tarr | 46—79 |
| 2,314,057 | 3/1943 | Slotsky et al. | 46—95 |
| 2,505,526 | 4/1950 | Costea | 46—44 |
| 2,637,139 | 5/1953 | Harris | 46—76 X |
| 2,781,610 | 2/1957 | Yamauchi | 46—206 X |
| 2,821,808 | 2/1958 | Rosato. | |
| 2,870,569 | 1/1959 | Bergstrand | 46—76 X |
| 2,917,866 | 12/1959 | Ullmann | 46—111 X |
| 2,920,682 | 1/1960 | Lindberg | 46—76 X |
| 3,045,391 | 7/1962 | Stanzel | 46—77 X |

RICHARD C. PINKHAM, *Primary Examiner.*

L. J. BOVASSO, *Assistant Examiner.*